(12) United States Patent
Koyama

(10) Patent No.: US 9,382,006 B2
(45) Date of Patent: Jul. 5, 2016

(54) AIRCRAFT LAVATORY UNIT AND STRUCTURE FOR ARRANGING SAME

(71) Applicant: The Yokohama Rubber Co., LTD., Minato-ku, Tokyo (JP)

(72) Inventor: Takashi Koyama, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 50 days.

(21) Appl. No.: 14/400,530

(22) PCT Filed: May 8, 2013

(86) PCT No.: PCT/JP2013/002952
§ 371 (c)(1),
(2) Date: Nov. 11, 2014

(87) PCT Pub. No.: WO2013/168416
PCT Pub. Date: Nov. 14, 2013

(65) Prior Publication Data
US 2015/0129718 A1    May 14, 2015

(30) Foreign Application Priority Data
May 11, 2012    (JP) .................................. 2012-109258

(51) Int. Cl.
*B64D 11/02* (2006.01)
*B64D 11/06* (2006.01)
*B64D 11/00* (2006.01)

(52) U.S. Cl.
CPC ................ *B64D 11/02* (2013.01); *B64D 11/06* (2013.01); *B64D 2011/0046* (2013.01)

(58) Field of Classification Search
CPC ...... B64D 11/02; B64D 11/06; B64D 11/003; B64D 2011/0046; E03C 1/01; E03D 1/003
See application file for complete search history.

(56) References Cited

U.S. PATENT DOCUMENTS

| | | | | |
|---|---|---|---|---|
| 6,079,669 A | * | 6/2000 | Hanay .................... | B64D 11/02 244/118.5 |
| 6,615,421 B2 | * | 9/2003 | Itakura ................... | B64D 11/02 244/118.5 |
| D487,137 S | | 2/2004 | Itakura | |

(Continued)

FOREIGN PATENT DOCUMENTS

| | | |
|---|---|---|
| DE | 10 2009 018 690 | 10/2010 |
| JP | 2009-513419 | 4/2009 |

(Continued)

OTHER PUBLICATIONS

International Search Report for International Application No. PCT/JP2013/002952 dated Aug. 13, 2013, 4 pages, Japan.

*Primary Examiner* — Valentina Xavier
(74) *Attorney, Agent, or Firm* — Thorpe North & Western

(57) ABSTRACT

An aircraft lavatory unit includes a second side wall having a long-space-section side wall and a wide-space-section side wall. The long-space-section side wall forms, between it and a first side wall, a long space section that extends with a uniform width. The wide-space-section side wall forms, between it and the first side wall, a wide space section that has a greater width than the long space section. A toilet bowl is arranged at an end in the extending direction of the long space section. A wash basin is arranged at one end in the width direction of the wide space section. A doorway is arranged in a front wall so as to be located closer to the other end in the width direction of the wide space section.

14 Claims, 14 Drawing Sheets

(56) References Cited

U.S. PATENT DOCUMENTS

| | | | |
|---|---|---|---|
| D593,645 S * | 6/2009 | Bock | D23/271 |
| 8,590,838 B2 * | 11/2013 | Cook | B64D 11/02 114/116 |
| D701,948 S * | 4/2014 | Schliwa | D23/274 |
| 8,925,862 B2 * | 1/2015 | Ehlers | B64D 11/02 244/118.5 |
| 8,991,947 B2 * | 3/2015 | Lee | B64D 47/00 312/242 |
| 9,045,230 B2 * | 6/2015 | Burrows | B64D 11/02 |
| 2004/0163170 A1 | 8/2004 | Cooper et al. | |
| 2007/0241232 A1 | 10/2007 | Thompson | |
| 2008/0179456 A1 | 7/2008 | Diergardt | |
| 2009/0283636 A1 | 11/2009 | Saint-Jalms et al. | |
| 2011/0139930 A1 * | 6/2011 | Sutthoff | B64D 11/02 244/118.5 |
| 2011/0169306 A1 | 7/2011 | Thompson | |
| 2011/0253835 A1 * | 10/2011 | Cook | B64D 11/02 244/118.5 |
| 2012/0112505 A1 | 5/2012 | Breuer et al. | |
| 2012/0228902 A1 | 9/2012 | Thompson | |
| 2012/0273614 A1 | 11/2012 | Ehlers et al. | |
| 2012/0325964 A1 * | 12/2012 | Hawkins | B64D 11/02 244/118.6 |
| 2013/0206905 A1 * | 8/2013 | Savian | B64D 11/003 244/118.5 |
| 2014/0196206 A1 * | 7/2014 | Savian | B64D 11/02 4/664 |
| 2014/0224930 A1 * | 8/2014 | Ivester | B64D 11/04 244/118.5 |
| 2015/0083859 A1 | 3/2015 | Ehlers et al. | |
| 2015/0298809 A1 * | 10/2015 | Minegishi | B64D 11/02 244/118.5 |
| 2015/0298810 A1 * | 10/2015 | Koyama | B64D 11/02 244/118.5 |

FOREIGN PATENT DOCUMENTS

| | | |
|---|---|---|
| WO | WO 2009/118242 | 10/2009 |
| WO | WO 2010/084048 | 7/2010 |
| WO | WO 2010/121862 | 10/2010 |
| WO | WO 2011/133576 | 10/2011 |

* cited by examiner

AIRCRAFT LAVATORY UNIT AND STRUCTURE FOR ARRANGING SAME

TECHNICAL FIELD

The present technology relates to an aircraft lavatory unit and a structure for arranging the same.

BACKGROUND

A plurality of seats, a plurality of lavatory units, a plurality of galleys, and so forth are arranged in the limited space within the fuselage of an aircraft.

Various proposals have been made for the sake of increasing the number of seats.

For example, U.S. Patent Publication Nos. U.S. 2008/0179456 A1 and U.S. 2009/0283636 A1 disclose movable aircraft lavatory units, and propose aircraft lavatory units whose layouts can be altered.

However, even if the layouts of aircraft lavatory units are altered, there is no change in the area occupied by aircraft lavatory units, creating limits to the extent to which the number of seats can be increased.

In addition, an aircraft lavatory unit, in many cases, will include a wash basin. However, simply disposing the wash basin in the aircraft lavatory unit will increase the width thereof, which is disadvantageous when attempting to increase the number of seats.

SUMMARY

The present technology has been devised in view of the circumstances described above. The present technology provides an aircraft lavatory unit and a structure for arranging the aircraft lavatory unit that are advantageous in increasing the number of seats.

An aircraft lavatory unit according to the present technology is provided with a body frame comprising a bottom wall, a first side wall and a second side wall extending from the bottom wall and facing each other, a rear wall connecting the side walls at one end, and a front wall connecting the side walls at another end and comprising a doorway; wherein: the second side wall comprises a long-space-section side wall that is located near the rear wall, extends from the bottom wall to at least a height greater than the height of a backrest of an aircraft seat in an upright position, and forms a long space section that extends linearly with a uniform width between the first and second side walls, and a wide-space-section side wall that is located near the front wall, extends from the bottom wall, connects to the long-space-section side wall, and forms a wide space section wider than the long space section between the first and second side walls; a toilet bowl and a wash basin are arranged within the body frame to form a lavatory; the toilet bowl is arranged at an end in the extending direction of the long space section near the rear wall; the wash basin is arranged at an end in the width direction of the wide space section; and the width of the body frame where the long-space-section side wall exposed to the outside of the body frame is located is set to the minimum dimensions sufficient for ensuring that the long space section has a width that allows a person to come and go between the doorway and the toilet bowl and that allows a person to sit on the toilet bowl.

The present technology also includes an arrangement structure for the aircraft lavatory unit, wherein: a fuselage of an aircraft comprises a longitudinal aisle extending in a longitudinal direction of the fuselage; seat groups in which a plurality of seat rows, the seat rows comprising a plurality of seats facing the front of the fuselage and arranged in rows along a latitudinal direction of the fuselage, are arranged in rows along the longitudinal direction of the fuselage on both left and right sides of the longitudinal aisle; and a latitudinal aisle extending in the latitudinal direction from a boarding entrance behind the seat groups and connecting to the longitudinal aisle. A rear seat row constituted by a rearmost seat row of at least one of the seat groups on the left and right sides of the longitudinal aisle, having a seat, located near the longitudinal aisle, removed in comparison to seat rows located in front of the rear seat row. The aircraft lavatory unit is arranged so that the long-space-section side wall is located adjacent to a backrest of a seat in the rear seat row, the wide-space-section side wall is located in the location of the removed seat, the first side wall faces the latitudinal aisle, and the front wall faces the longitudinal aisle.

The aircraft lavatory unit according to the present technology is configured so that the toilet bowl is arranged at an end of the long space section near the rear wall, and the width-occupying wash basin is not located in the long space section.

Then, a wide space section that is wider than the long space section is provided, so that the width-occupying wash basin is arranged at an end of the width direction of the wide space section, and a person can come and go from the doorway through the wide space section to the long space section.

This allows the width of the body frame where the long-space-section side wall exposed to the outside of the body frame is located to be of the minimum dimensions sufficient for ensuring that the long space section has a width that allows a person to come and go between the doorway and the toilet bowl and that allows a person to sit on the toilet bowl.

Accordingly, the part of the body frame where the long-space-section side wall exposed to the outside of the body frame is located when the aircraft lavatory unit is seen in plan view can be formed in a rectangular shape extending with a small uniform width to at least a height greater than the height of the backrest of the aircraft seat when in an upright position, allowing this part to be rendered slimmer in form and the area of the floor of the fuselage occupied by the rectangular part to be reduced, which is advantageous in increasing the number of seats within the aircraft.

Further, in accordance with the arrangement structure for the aircraft lavatory unit according to the present technology, behind the remaining seat in the rear seat row, the part of the aircraft lavatory unit where the long-space-section side wall exposed to the outside of the body frame is located occupies very little space with respect to the longitudinal direction of the fuselage.

It is thus possible to increase the number of seats in front of the long-space-section side wall by decreasing the space between seat rows with respect to the longitudinal direction of the fuselage by a few inches, such as one or two inches.

DETAILED DESCRIPTION (First Embodiment)

Next, an aircraft lavatory unit according to an embodiment of the present technology and an arrangement structure therefor will be described with reference to the drawings.

Figure 1:
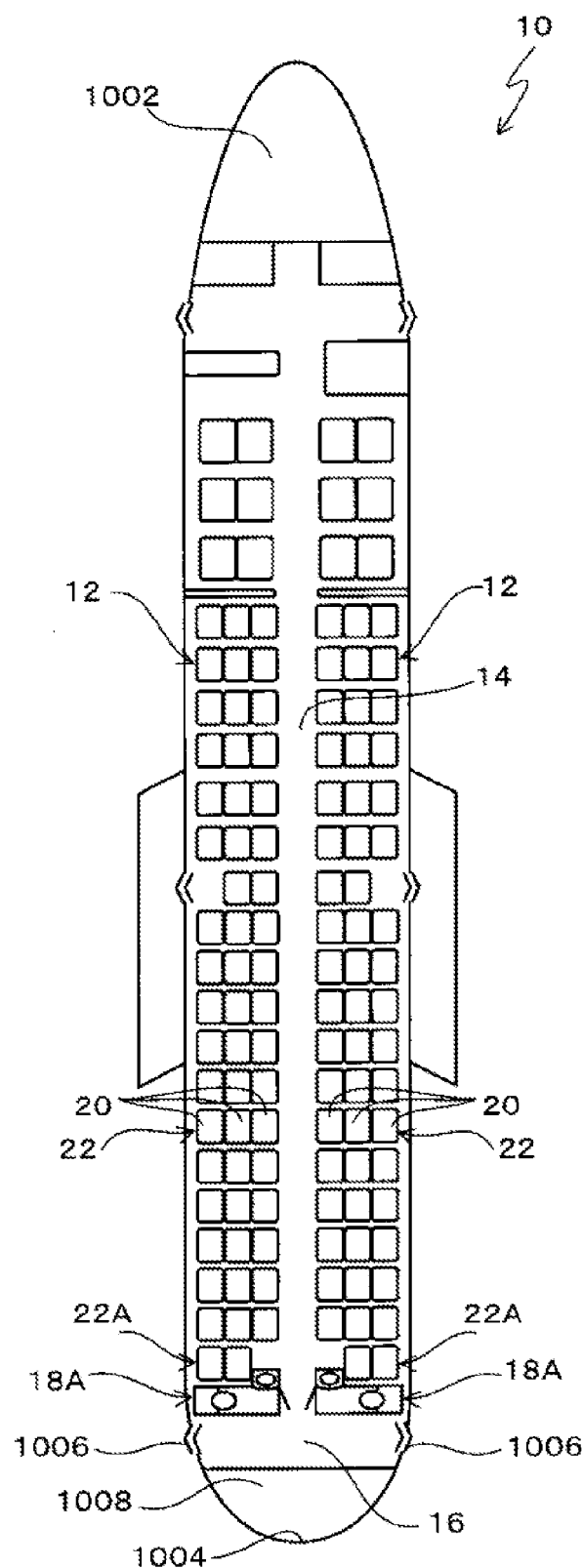
FIG. 1 is an explanatory view illustrating an interior layout of an aircraft according to a first embodiment.

As illustrated in FIG. 1, an aircraft fuselage 10 is provided with seat groups 12, a longitudinal aisle 14, a latitudinal aisle 16, and aircraft lavatory units 18A.

A cockpit 1002 constitutes the front part of the aircraft fuselage 10, and a pressure bulkhead 1004 constitutes the rear part thereof. Between the front and rear parts are provided the seat groups 12, longitudinal aisle 14, latitudinal aisle 16, and aircraft lavatory units 18A. In the drawing, 1006 is a rear boarding entrance, and 1008 is a galley.

The longitudinal aisle 14 extends along the center of the fuselage 10 in the longitudinal direction of the fuselage 10.

The seat groups 12 are provided on both left and right sides of the longitudinal aisle 14.

The seat groups 12 are each constituted by a plurality of seat rows 22 arranged in rows along the longitudinal direction of the fuselage 10, the seat rows 22 including a plurality of seats 20 facing the front of the fuselage 10 and arranged in rows along the latitudinal direction of the fuselage 10. In the present embodiment, each of the seat rows 22 is constituted by three seats 20 arranged in a row in the latitudinal direction.

The seats 20 are each provided with reclining functionality, and backrests 2002 thereof (see FIG. 7) can be adjusted between an upright position and a reclining position.

The latitudinal aisle 16 extends in the latitudinal direction from boarding entrances 1006 of the fuselage 10 behind the seat groups 12, and connects with the longitudinal aisle 14.

Figure 2:
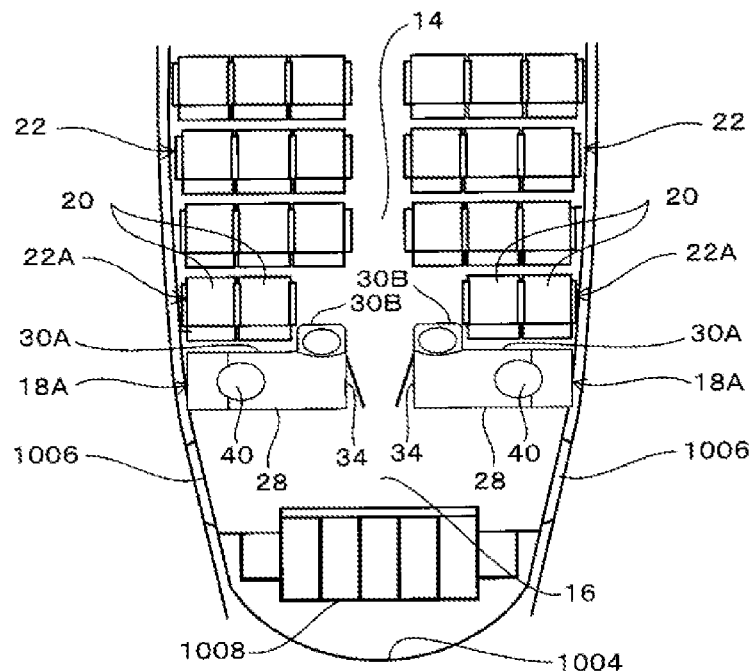
FIG. 2 is a magnified view of layouts of main parts within an aircraft according to the first embodiment.

As illustrated in FIG. 2, the rear seat row 22 located farthest to the rear of each of the seat groups 12 has a seat, located near the longitudinal aisle 14, removed in comparison to seat rows 22 located in front of the rear seat row 22; thus, there are two seats 20 aligned in rows in the latitudinal direction.

The aircraft lavatory units 18A are each provided on the floor of the fuselage 10 between the rear seat row 22A and the latitudinal aisle 16.

Next, the composition of the aircraft lavatory units 18A will be described with reference to FIGS. 3 to 7.

A body frame 24 of the aircraft lavatory unit 18A comprises a bottom wall 26, a first side wall 28 and a second side wall 30 extending from the bottom wall 26 and facing each other, a rear wall 32 connecting the side walls 28, 30 at one end, a front wall 34 connecting the side walls 28, 30 at another end and comprising a doorway 38, and a ceiling wall 36.

The second side wall 30 comprises a long-space-section side wall 30A and a wide-space-section side wall 30B.

Figure 7:
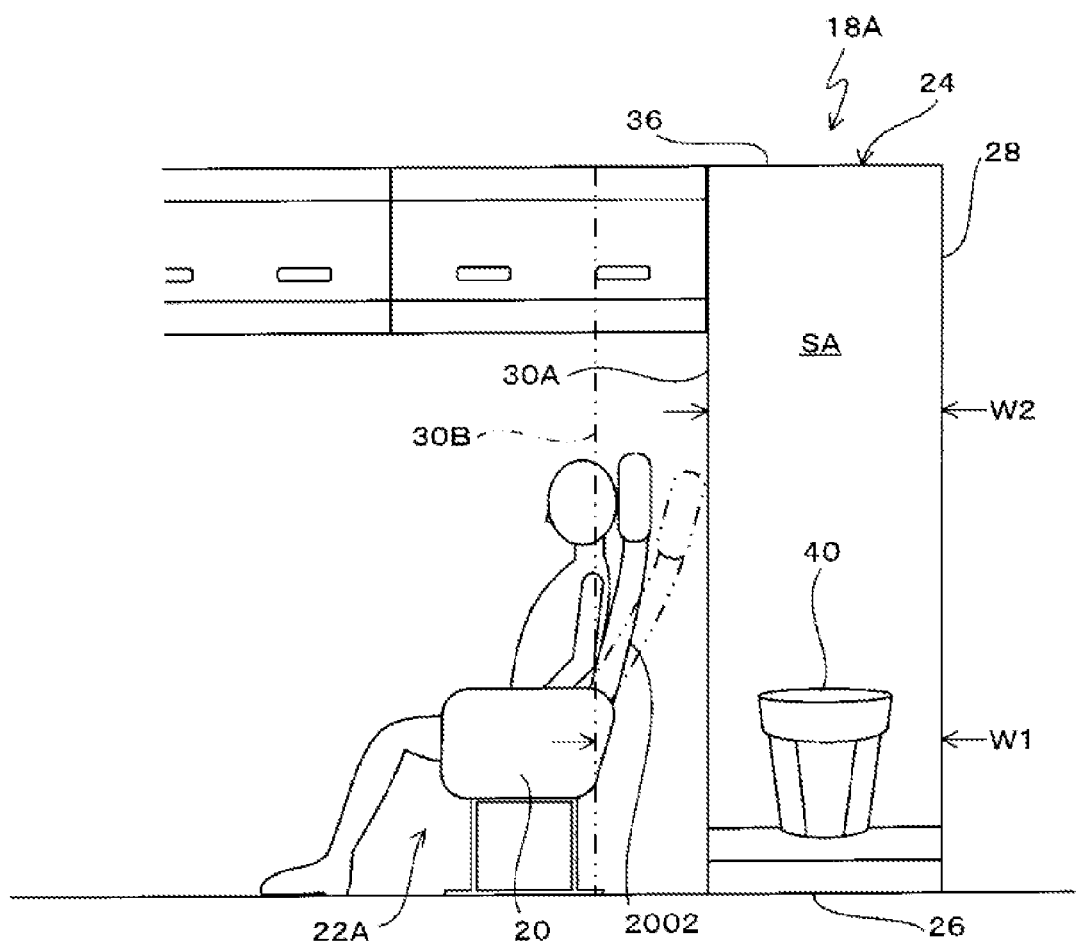
FIG. 7 is a side view showing the relationship between the aircraft lavatory unit 18A according to the first embodiment installed within an aircraft, and a rear seat row 22A.

The long-space-section side wall 30A is located near the rear wall 32. As illustrated in FIG. 7, the long-space-section side wall 30A extends from the bottom wall 26 to at least a height greater than the height of the backrests 2002 of the aircraft seats 20 when in an upright position and forms a long space section SA that extends linearly with a uniform width between the first side wall 28 and the long-space-section side wall 30A. In the present embodiment, the long-space-section side wall 30A extends to the ceiling wall 36.

The wide-space-section side wall 30B is located on near the front wall 34, extends from the bottom wall 26, is connected to the long-space-section side wall 30A, and forms a wide space section SB wider than the long space section SA between the first side wall 28 and the wide-space-section side wall 30B.

Figure 3:
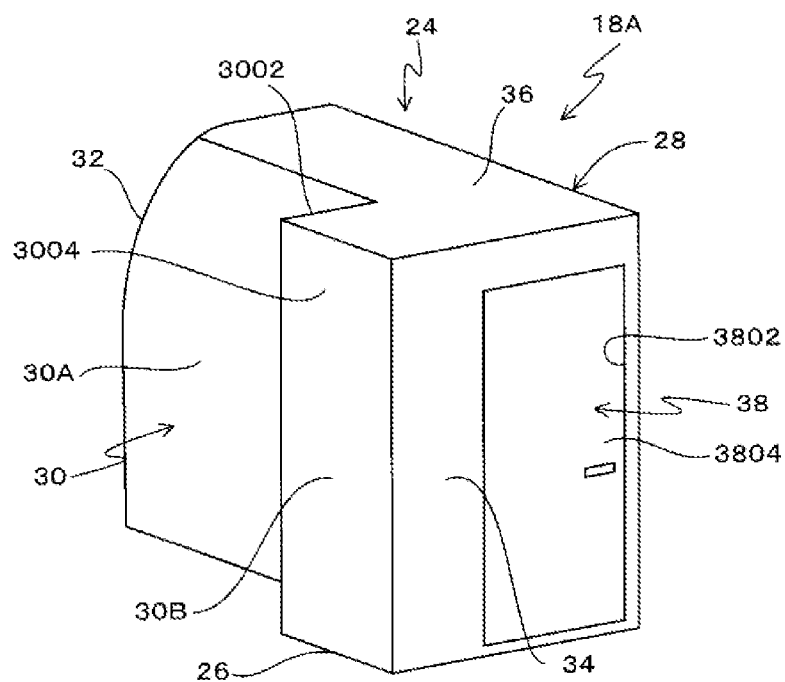
FIG. 3 is a perspective view of an aircraft lavatory unit 18A according to the first embodiment.

Note that, as illustrated in FIG. 3, the rear wall 32 is formed so as to have a curved surface corresponding to the side wall of the fuselage, the shape of the rear wall 32 differing according to the shape of the side wall of the fuselage in which the aircraft lavatory unit 18A is installed.

Figure 4:
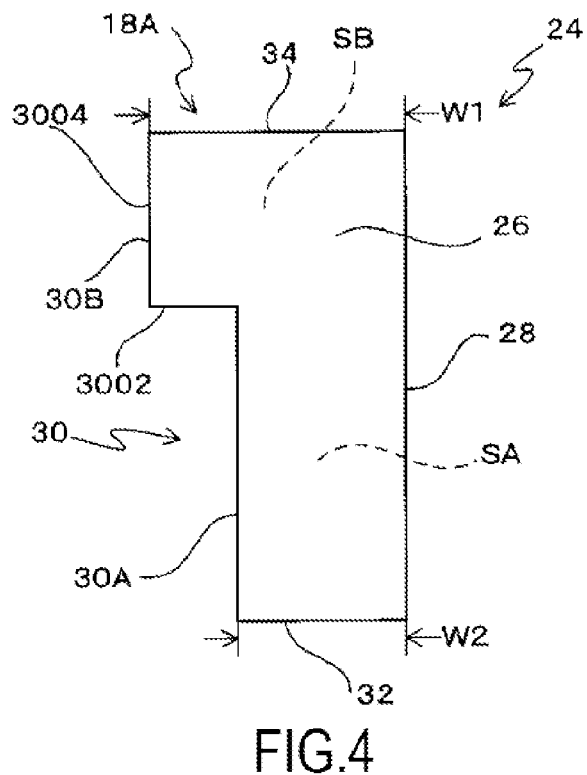
FIG. 4 is a bottom plan view of the aircraft lavatory unit 18A according to the first embodiment.

As illustrated in FIG. 4, the wide-space-section side wall 30B comprises an extending surface section 3002 and a side wall section 3004.

The extending surface section 3002 extends from an end of the long-space-section side wall 30A near the wide-space-section side wall 30B in a direction away from the first side wall 28.

The side wall section 3004 bends away from the extending surface section 3002, extends in parallel with the first side wall 28, and connects to the front wall 34.

A toilet bowl 40 and a wash basin 42 are arranged within the body frame 24 to form a lavatory.

The toilet bowl 40 is arranged at an end in the extending direction of the long space section SA near the rear wall 32.

Figure 6:
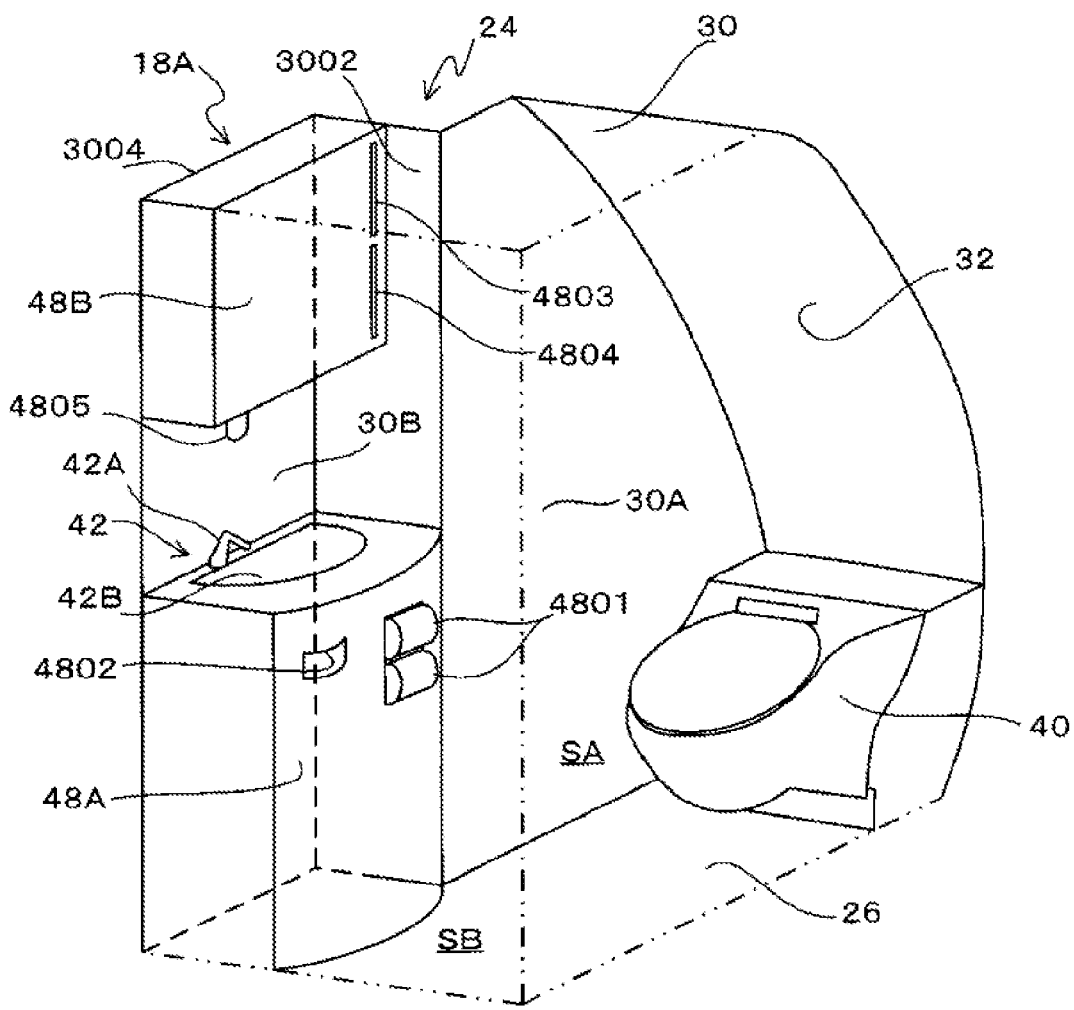
FIG. 6 is an exploded perspective view of the aircraft lavatory unit 18A according to the first embodiment.

As illustrated in FIG. 6, the wash basin 42 comprises a tap 42A and a bowl 42B. The wash basin 42 is arranged at one end in the width direction of the wide space section SB, and, in the present embodiment, is arranged on the inner side of the wide-space-section side wall 30B.

Further, in the present embodiment, a lower housing compartment 48A and an upper housing compartment 48B are provided on the inner side of the wide-space-section side wall 30B with a space therebetween with respect to the vertical direction.

The lower housing compartment 48A has a waste receptacle housed therein and has toilet tissue 4801 arranged therein. The lower housing compartment 48A comprises a waste chute 4802 leading to the waste receptacle, and the wash basin 42 is provided on a top surface of the lower housing compartment 48A.

Dispensers for paper towels, tissue paper, and paper cups are housed in the upper housing compartment 48B; in FIG. 6, 4803 is a paper towel dispenser mouth, 4804 is a tissue paper dispenser mouth, and 4805 is a paper cup.

The doorway 38 is arranged in the front wall 34 so as to be closer to the other end in the width direction of the wide space section SB. In the present embodiment, the doorway 38 is arranged so as to be closer to the first side wall 28. The doorway 38 is formed by an opening 3802 formed in the front wall 34 and a door 3804 that opens and closes off the opening 3802.

A width W1 of the body frame 24 with respect to the width direction of the wide space section SB is set to the minimum dimensions sufficient for ensuring that there is enough space between the end surfaces of the upper and lower housing compartments 48A, 48B located on the inner side of the wide space section SB and the inner surface of the first side wall 28 for a person to be capable of coming and going between the doorway 38 and the long space section SA. In other words, the width W1 of the body frame 24 where the wide space section SB is located is set to the minimum dimensions sufficient for ensuring that the wide space section SB has a width that allows a person to pass through between the wash basin 42 and the first side wall 28 and that allows a person to come and go between the doorway 38 and the long space section SA.

In this case, locating the wash basin 42 at one end in the width direction of the wide space section SB and locating the doorway 38 so as to be closer to the other end in the width direction of the wide space section SB is advantageous in minimizing the width W1 of the body frame 24 while ensuring that there is enough space between the end surfaces of the upper and lower housing compartments 48A, 48B located on the inner side of the wide space section SB and the inner surface of the first side wall 28 for a person to be capable of coming and going between the doorway 38 and the long space section SA. Reducing the width W1 of the body frame 24 is advantageous in facilitating travel between the rear seat rows 22A and the longitudinal aisle 14 when the aircraft lavatory units 18A are installed within the aircraft, as will be described hereafter.

Figure 5:
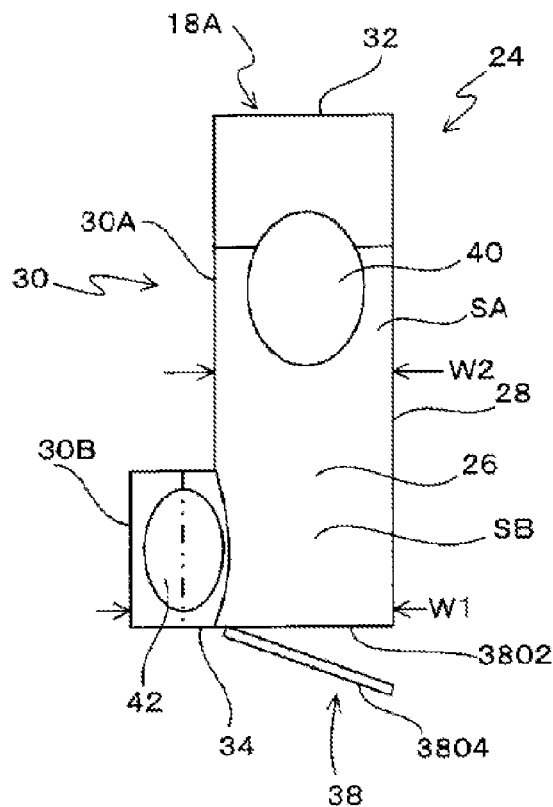
FIG. 5 is a plan view of the aircraft lavatory unit 18A according to the first embodiment.

As illustrated in FIGS. 4, 5, and 7, a width W2 of the body frame 24 where the long-space-section side wall 30A exposed to the outer side of the body frame 24 is located is set to the minimum dimensions sufficient for ensuring that the long space section SA has a width that allows a person to enter and exit the long space section SA and that allows a person to sit on the toilet bowl 40.

Specifically, the width W1 is from 700 mm to 900 mm, and the width W2 is from 600 mm to 750 mm.

In the aircraft lavatory unit 18A according to the embodiment, the toilet bowl 40 is arranged at an end of the long space section SA located away from the front wall 34, and the width-occupying wash basin 42 is not arranged in the long space section SA.

Then, the wide space section SB that is wider than the long space section SA is provided, and the width-occupying wash basin 42 is arranged at an end in the width direction of the wide space section SB, so that a person can come and go from the doorway 38 that is closer to the other end in the width direction of the wide space section SB through the wide space section SB to the long space section SA.

As a result, the width W2 of the body frame 24 where the long-space-section side wall 30A is exposed to the outer side of the body frame 24 can be the minimum dimensions sufficient for ensuring that the long space section SA has a width that allows a person to come and go between the doorway 38 and the toilet bowl 40 and that allows a person to sit on the toilet bowl 40.

Accordingly, a part of the body frame 24 where the long-space-section side wall 30A exposed to the outer side of the body frame 24 is located when the aircraft lavatory unit 18A is seen in plan view can be formed in a rectangular shape extending linearly with a small uniform width to at least a height greater than the height of the backrests 2002 of the aircraft seats 20 when in an upright position, allowing this part to be rendered more slim in form and the area of the floor of the fuselage occupied by the rectangular part to be reduced, which is advantageous in increasing the number of seats within the aircraft.

Further, the aircraft lavatory units 18A comprising the above constitution are installed within the aircraft in the following manner.

As illustrated in FIGS. 1 and 2, the aircraft lavatory unit 18A is arranged so that the long-space-section side wall 30A is located adjacent to the backrests 2002 of the seats 20 of each of the rear seat rows 22A, the wide space section side wall 30B is located in the location of the removed seat 20, the first side wall 28 is located facing the latitudinal aisle 16, and the front wall 34 is located facing the longitudinal aisle 14.

More specifically, as illustrated by the imaginary lines in FIG. 7, the aircraft lavatory unit 18A is arranged so that the minimum space is ensured behind the backrests 2002 of the seats 20 that is sufficient for passengers to make full use of the reclining functionality of the seats 20, and the long-space-section side wall 30A is located adjacent to the backrests 2002 of the seats 20 of each of the rear seat rows 22A when in the reclining position.

Accordingly, as illustrated in FIG. 5, the width W2 of the body frame 24 where the long-space-section side wall 30A exposed to the outer side of the body frame 24 is located is set to the minimum dimensions sufficient for ensuring that the long space section SA has a width that allows a person to enter and exit the long space section SA and that allows a person to sit on the toilet bowl 40 with respect to the longitudinal direction of the fuselage 10. Thus, when the aircraft lavatory unit 18A is arranged so that the long-space-section side wall 30A is located adjacent to the backrests 2002 of the seats 20 of the rear seat row 22A and the wide-space-section side wall 30B is located in the space where the seat 20 is removed, as illustrated in FIG. 2, the part of the aircraft lavatory unit 18A where the long-space-section side wall 30A is located behind the rear seat row 22A occupies very little space with respect to the longitudinal direction of the fuselage 10.

Figure 18:
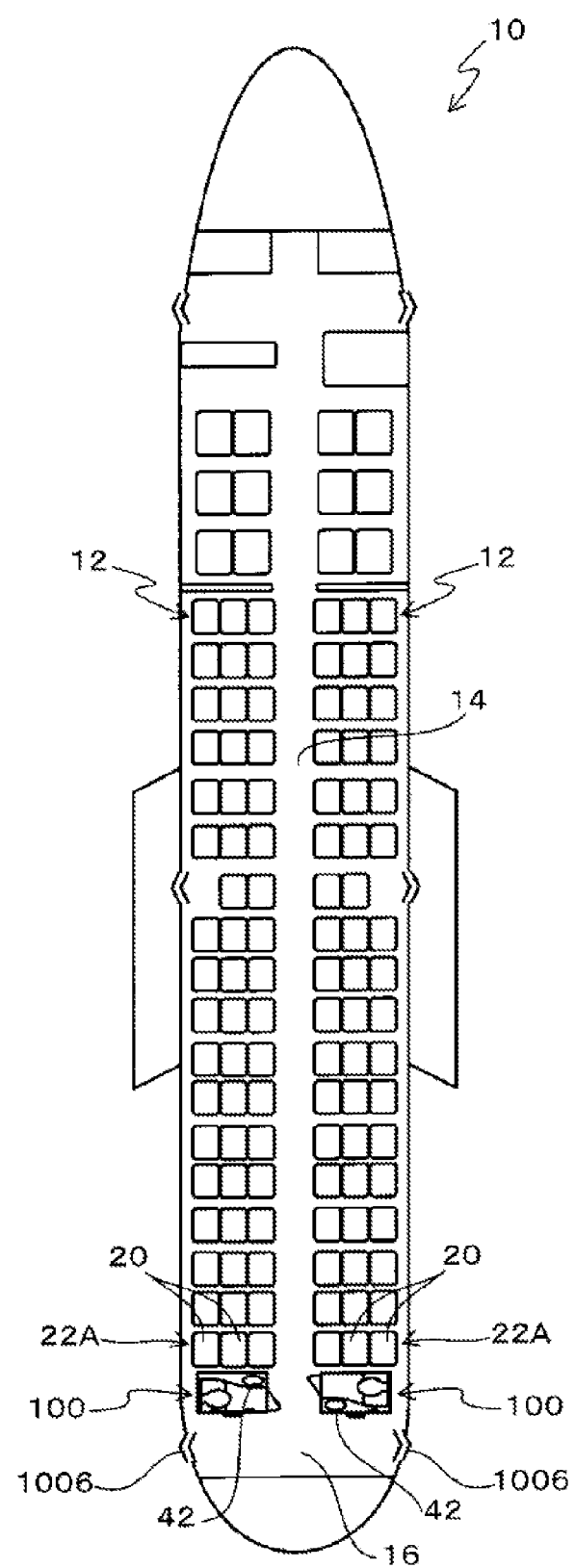
FIG. 18 is an explanatory view illustrating of a comparative example of an interior layout of an aircraft.

Accordingly, two more seats 20 can be installed in front of the long-space-section side wall 30A on each side of the longitudinal aisle 14 by decreasing the space between seat rows 22 with respect to the longitudinal direction of the fuselage 10 by a few inches, such as one or two inches, allowing for the installation of a total of four more seats 20 than that of a comparative example in which wash basin 42 is arranged between both the side walls 28, 30, and the aircraft lavatory units 100, which have a rectangular shape as seen in plan view, are arranged behind the rear seat rows 22A, as illustrated in FIG. 18.

Thus, in accordance with the present embodiment, an aircraft lavatory unit and an arrangement structure therefor that are advantageous in increasing the number of seats are yielded.

Note that regarding the width W1 of the body frame 24 with respect to the width direction of the wide space section SB, if the aircraft lavatory unit 18A is arranged so that the long-space-section side wall 30A is located adjacent to the backrests 2002 of the seats 20 of the rear seat row 22A, as illustrated in FIG. 7, having the wide-space-section side wall 30B be located at a rear end or rear part of the seat surfaces of the seats 20 of the rear seat row 22A, or behind the seat surfaces, is advantageous in allowing for more easily entering and exiting the two seats 20 in front of the long-space-section side wall 30A from and to the longitudinal aisle 14.

(Second Embodiment)

Figure 8:
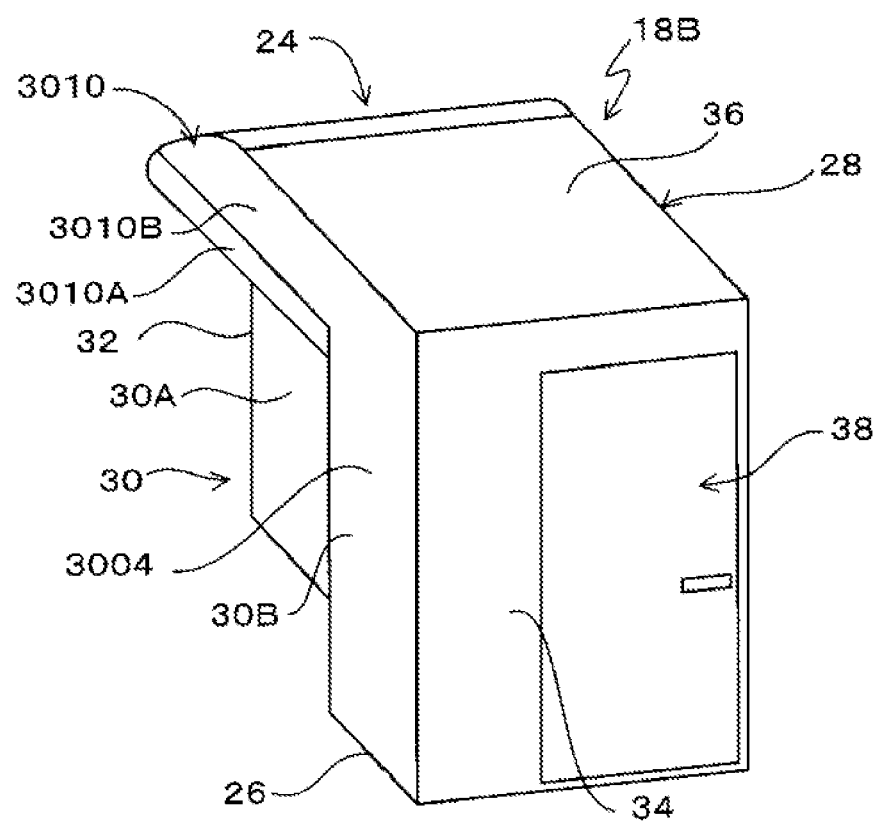
FIG. 8 is a perspective view of an aircraft lavatory unit 18B according to a second embodiment.

Next, a second embodiment will be described with reference to FIGS. 8 and 9. Note that, in the embodiment described hereafter, only those points differing from the first embodiment will be described, and description of points similar to the first embodiment will be omitted.

In an aircraft lavatory unit 18B according to the second embodiment, the long-space-section side wall 30A does not extend to the ceiling wall 36, but rather extends to a height H that is greater than the height of the backrests 2002 of the aircraft seats 20 when in the upright position.

In this case, the height H that is greater than the height of the backrests 2002 of the aircraft seats 20 when in the upright position is the height from the floor of the fuselage 10, or from the undersurface of the bottom wall 26 of the aircraft lavatory unit 18B.

Figure 9:
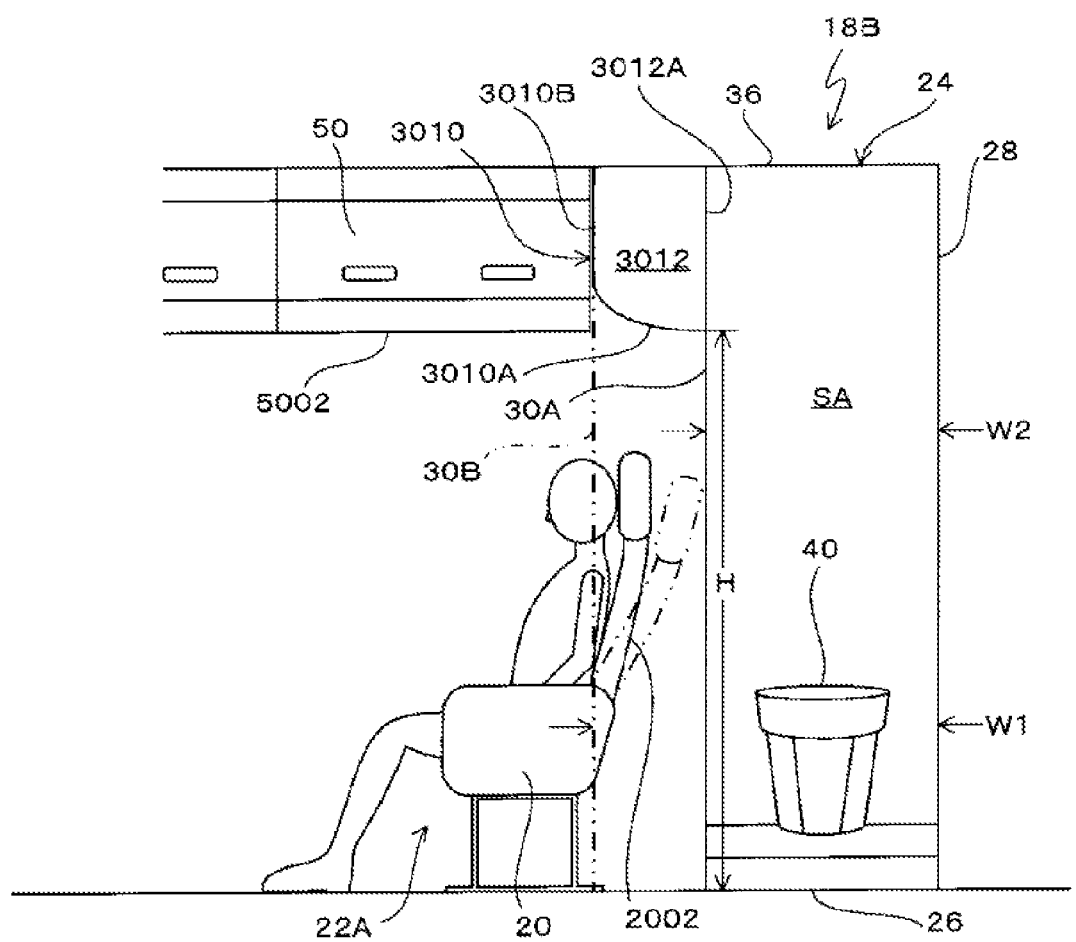
FIG. 9 is a side view showing the relationship between the aircraft lavatory unit 18B according to the second embodiment installed within an aircraft, and a rear seat row 22A.

As illustrated in FIG. 9, the height H is such that, even if there is a projection at height H, the projection will be located over the head of a passenger seated in the aircraft seat 20 when the backrest 2002 is in the upright position and will not come into contact with the head, and the passenger's head will not come into contact with the projection when the passenger is taking the aircraft seat 20 or gets up from the aircraft seat 20.

Specifically, the height H is in a range from 150 to 170 cm.

As illustrated in FIG. 9, having the height H be the same as that of an undersurface 5002 of a luggage compartment 50 provided on an upper part of a side wall of the fuselage 10, is advantageous in improving the design of the interior of the aircraft.

The aircraft lavatory unit 18B according to the second embodiment is provided with a projecting wall section 3010 projecting from an upper end of the long-space-section side wall 30A in a direction away from the first side wall 28 and connecting to the ceiling wall 36, and the rear wall 32.

The projecting wall section 3010 comprises an undersurface section 3010A that extends from an upper end of the long-space-section side wall 30A in a direction away from the first side wall 28, and a side wall section 3010B that bends away from the undersurface section 3010A, extends in parallel with the first side wall 28, and continuously connects with the ceiling wall 36 and the side wall section 3004 of the wide-space-section side wall 30B.

Then, a lavatory storage shelf 3012 for storing lavatory supplies is formed at a location inside the projecting wall section 3010. In FIG. 9, 3012A is a wall separating the storage shelf 3012 from the lavatory; this wall 3012A is, for example, a surface of a removable panel or a surface of an openable-and-closable door.

Note that the height H of the undersurface section 3010A is the same as the height H of the long-space-section side wall 30A (specifically, within a range from 150 to 170 cm). As illustrated in FIG. 9, having this height H be the same as the height of the undersurface 5002 of the luggage compartment 50 provided on an upper part of the side wall of the fuselage 10 is advantageous for improving the design of the interior of the aircraft.

The same effects as the first embodiment are also exhibited by the second embodiment.

Accordingly, in the aircraft lavatory unit 18B according to the second embodiment as well, the part of the body frame 24 where the long-space-section side wall 30A exposed to the outer side of the body frame 24 is located when the aircraft lavatory unit 18B is seen in plan view can be formed in a rectangular shape extending linearly with a small uniform width to at least a height greater than the height of the backrests 2002 of the aircraft seats 20 when in an upright position, allowing this part to be rendered more slim in form and the area of the floor of the fuselage occupied by the rectangular part to be reduced, which is advantageous in increasing the number of seats within the aircraft.

Further, in an arrangement structure for the aircraft lavatory unit 18B according to the second embodiment as well, the width W2 of the body frame 24 with respect to the longitudinal direction of the fuselage 10 where the long-space-section side wall 30A exposed to the outer side of the body frame 24 is located is set to the minimum dimensions sufficient for ensuring that the long space section SA has a width that allows a person to enter and exit the long space section SA and that allows a person to sit on the toilet bowl 40. Thus, when the aircraft lavatory unit 18B is arranged so that the long-space-section side wall 30A is located adjacent to the backrests 2002 of the seats 20 of the rear seat row 22A, and the wide-space-section side wall 30B is located in the location of the removed seat 20, the part of the aircraft lavatory unit 18B where the long-space-section side wall 30A is located behind the rear seat row 22A occupies very little space with respect to the longitudinal direction of the fuselage 10, which is advantageous in increasing the number of seats.

Moreover, in accordance with the second embodiment, the aircraft lavatory unit 18B is provided with the storage shelf 3012, which is advantageous in increasing the convenience of the lavatory.

(Third Embodiment)

Figure 10:
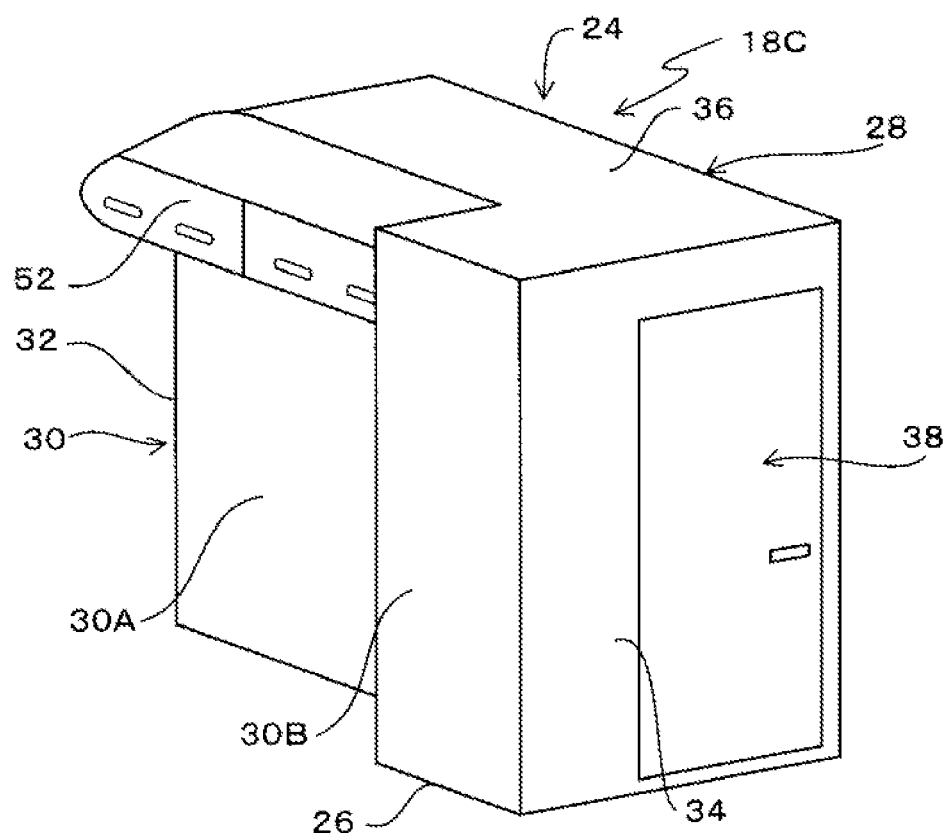
FIG. 10 is a perspective view of an aircraft lavatory unit 18C according to a third embodiment.
Figure 11:
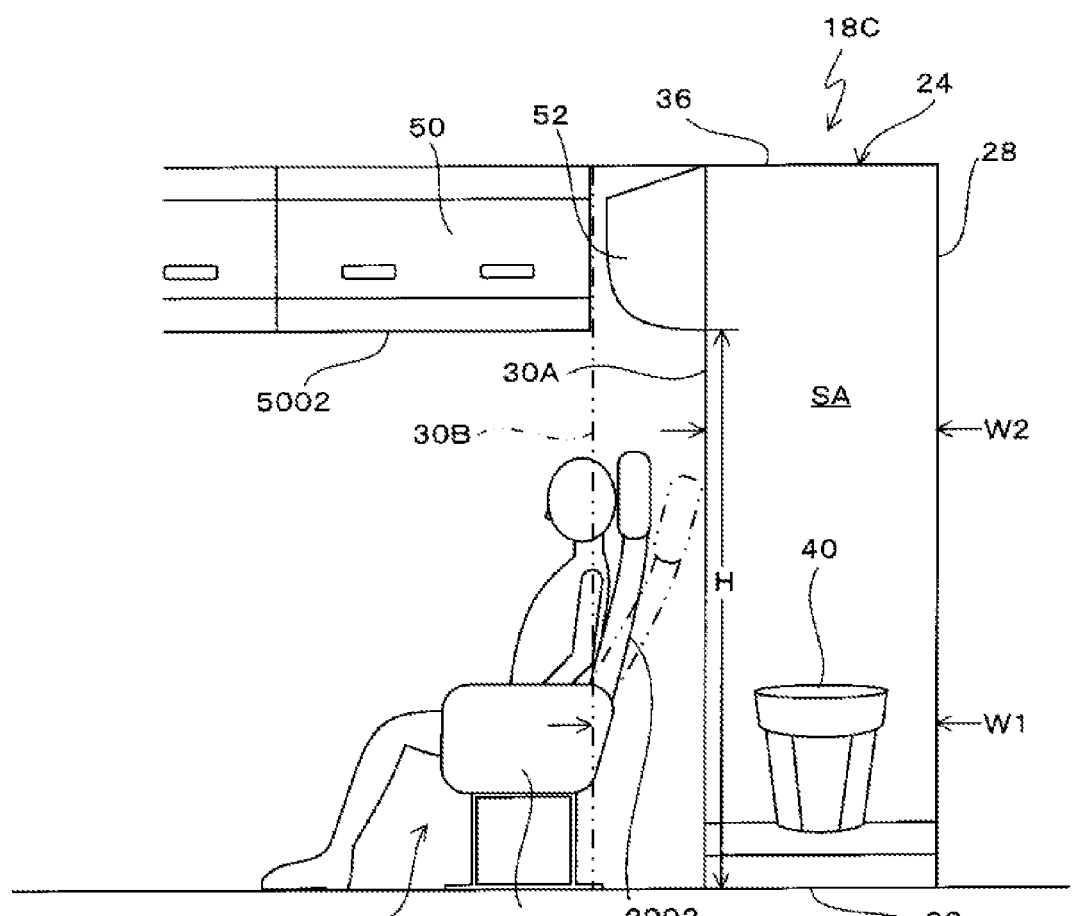
FIG. 11 is a side view showing the relationship between the aircraft lavatory unit 18C according to the third embodiment installed within an aircraft, and a rear seat row 22A.

Next, a third embodiment will be described with reference to FIGS. 10 and 11.

In an aircraft lavatory unit 18C according to the third embodiment, the long-space-section side wall 30A extends from the bottom wall 26 to the ceiling wall 36, as in the first embodiment.

In the third embodiment, a luggage compartment 52 for storing luggage or supplies within the passenger cabin is provided at a location at a height H that is greater than the height of the backrests 2002 of the aircraft seats 20 when in an upright position on an outer surface of the long-space-section side wall 30A located on the opposite side from the long space section SA.

The luggage compartment 52 is formed at the same height H as the undersurface 5002 of the luggage compartment 50 provided on the upper part of the side wall of the fuselage 10 and in the same shape as the luggage compartment 50, which is advantageous in improving the design of the interior of the aircraft. The height H of the luggage compartment 52 is defined the same as the height of the long-space-section side wall 30A and the height H of the undersurface section 3010A according to the second embodiment.

The same effects as the first embodiment are also exhibited by the third embodiment.

Accordingly, in the aircraft lavatory unit 18C according to the third embodiment as well, the part of the body frame 24 where the long-space-section side wall 30A exposed to the outer side of the body frame 24 is located when the aircraft lavatory unit 18C is seen in plan view can be formed in a rectangular shape extending linearly with a small uniform width to a height greater than the height of the backrests 2002 of the aircraft seats 20 when in an upright position, allowing this part to be rendered more slim in form and the area of the floor of the fuselage occupied by the rectangular part to be reduced, which is advantageous in increasing the number of seats within the aircraft.

In an arrangement structure for the aircraft lavatory unit 18C according to the third embodiment as well, the width W2 of the body frame 24 with respect to the longitudinal direction of the fuselage 10 where the long-space-section side wall 30A exposed to the outer side of the body frame 24 is located is set to the minimum dimensions sufficient for ensuring that the long space section SA has a width that allows a person to enter and exit the long space section SA and that allows a person to sit on the toilet bowl 40.

Thus, when the aircraft lavatory unit 18C is arranged so that the long-space-section side wall 30A is located adjacent to the backrests 2002 of the seats 20 of the rear seat row 22A, and the wide-space-section side wall 30B is located in the location of the removed seat 20, the part of the aircraft lavatory unit 18C where the long-space-section side wall 30A is located behind the rear seat row 22A occupies very little space with respect to the longitudinal direction of the fuselage 10, which is advantageous in increasing the number of seats.

Moreover, in the third embodiment, the aircraft lavatory unit 18C is made use of to increase the number of luggage compartments 50 in a simple manner, which is advantageous in managing passenger luggage in a simple manner and accommodating more passenger luggage.

(Fourth Embodiment)

Figure 12:
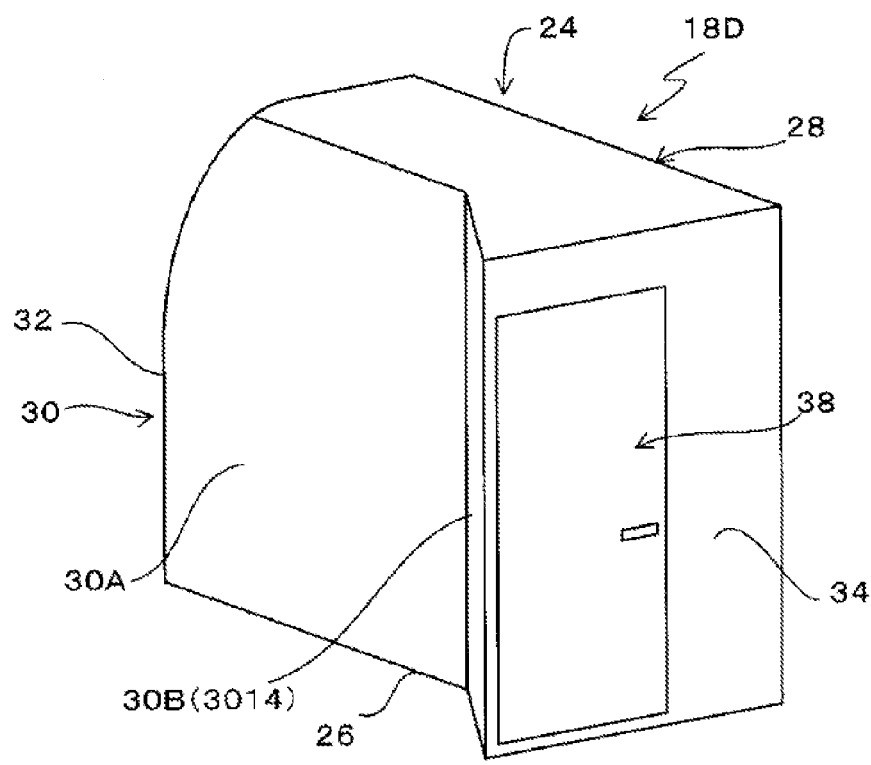
FIG. 12 is a perspective view of an aircraft lavatory unit 18D according to a fourth embodiment.
Figure 13:
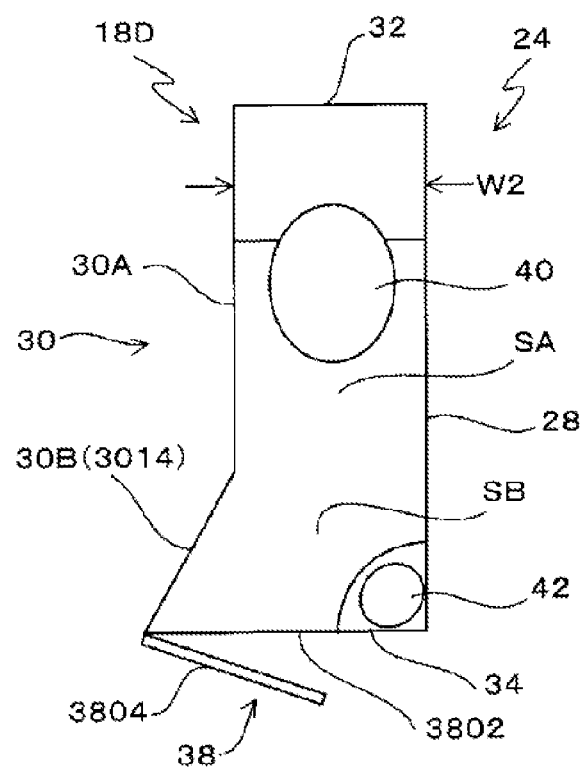
FIG. 13 is a plan view of the aircraft lavatory unit 18D according to the fourth embodiment.

Next, a fourth embodiment will be described with reference to FIGS. 12 to 14.

In an aircraft lavatory unit 18D according to the fourth embodiment, the position of the wash basin 42 and the position of the doorway 38 differ from the first embodiment.

Specifically, in the fourth embodiment, the wash basin 42 is arranged in a corner of the wide space section SB where the first side wall 28 and the front wall 34 intersect.

Further, the doorway 38 is arranged at a location in the front wall 34, closer to the wide-space-section side wall 30B opposite the wash basin 42.

The wide-space-section side wall 30B also differs from that of the first embodiment in correspondence with the layout of the wash basin 42 and the doorway 38.

Specifically, in the fourth embodiment, the wide-space-section side wall 30B is formed by a flat slanted wall 3014 that connects an end of the front wall 34 and a front end of the long-space-section side wall 30A and slants with respect to the long-space-section side wall 30A.

Figure 14:
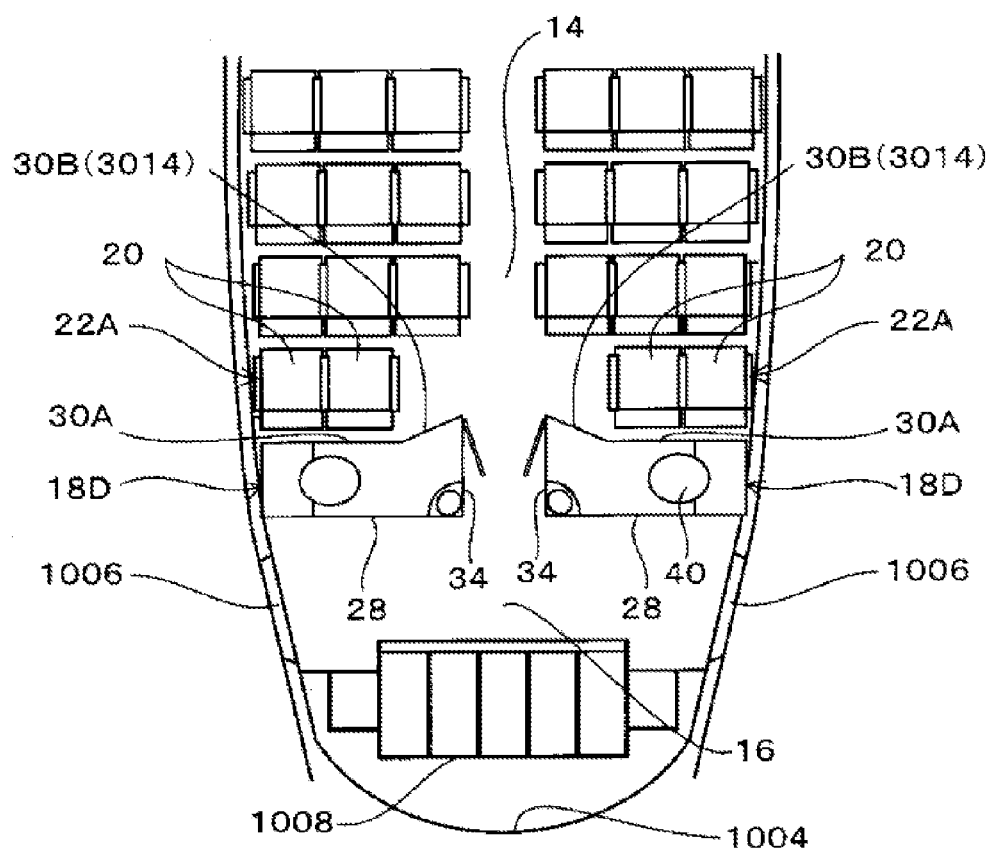
FIG. 14 is a magnified view of layouts of main parts within an aircraft according to the fourth embodiment.

In addition to naturally yielding the same effects as the first embodiment, the fourth embodiment has a wide-space-section side wall 30B constituted by a slanted wall 3014, securing a triangularly shaped space, as seen in plan view, in front of the wide-space-section side wall 30B on the side of a seat 20, out of the two seats 20 constituting the rear seat row 22A, that is located near the longitudinal aisle 14, as illustrated in FIG. 14. Thus, this is advantageous in easily entering and exiting the rear seat rows 22A from and to the longitudinal aisle 14.

(Fifth Embodiment)

Figure 15:
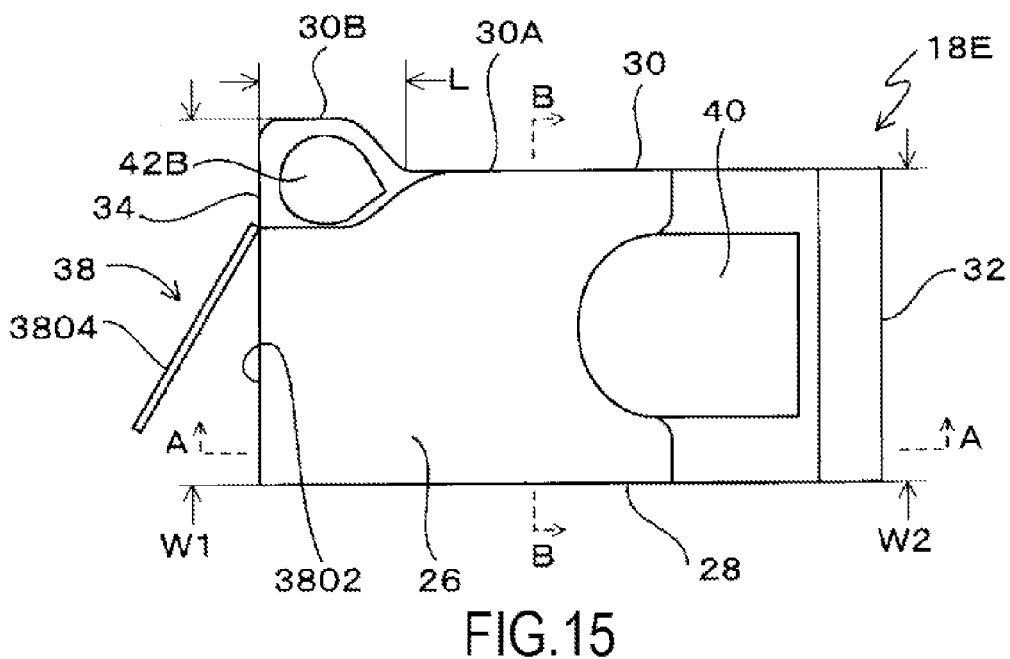
FIG. 15 is a plan view of an aircraft lavatory unit 18E according to a fifth embodiment.

Next, a fifth embodiment will be described with reference to FIGS. 15 to 17.

In an aircraft lavatory unit 18E according to the fifth embodiment, the shape of the wide-space-section side wall 30B differs from that of the first embodiment, and the shapes of the housing compartments 48A, 48B also correspondingly differ from those of the first embodiment.

Specifically, the length L of the wide-space-section side wall 30B (or the length of the wide space section SB) is less than in the first embodiment, and the lengths of the housing compartments 48A, 48B are also correspondingly shortened.

As in the first embodiment, a waste receptacle is housed within the lower housing compartment 48A, and toilet tissue 4801 is arranged therein. The lower housing compartment 48A comprises a waste chute 4802 leading to the waste receptacle, and the wash basin 42, which comprises a tap 42A and a bowl 42B, is provided on a top surface of the lower housing compartment 48A.

Figure 16:
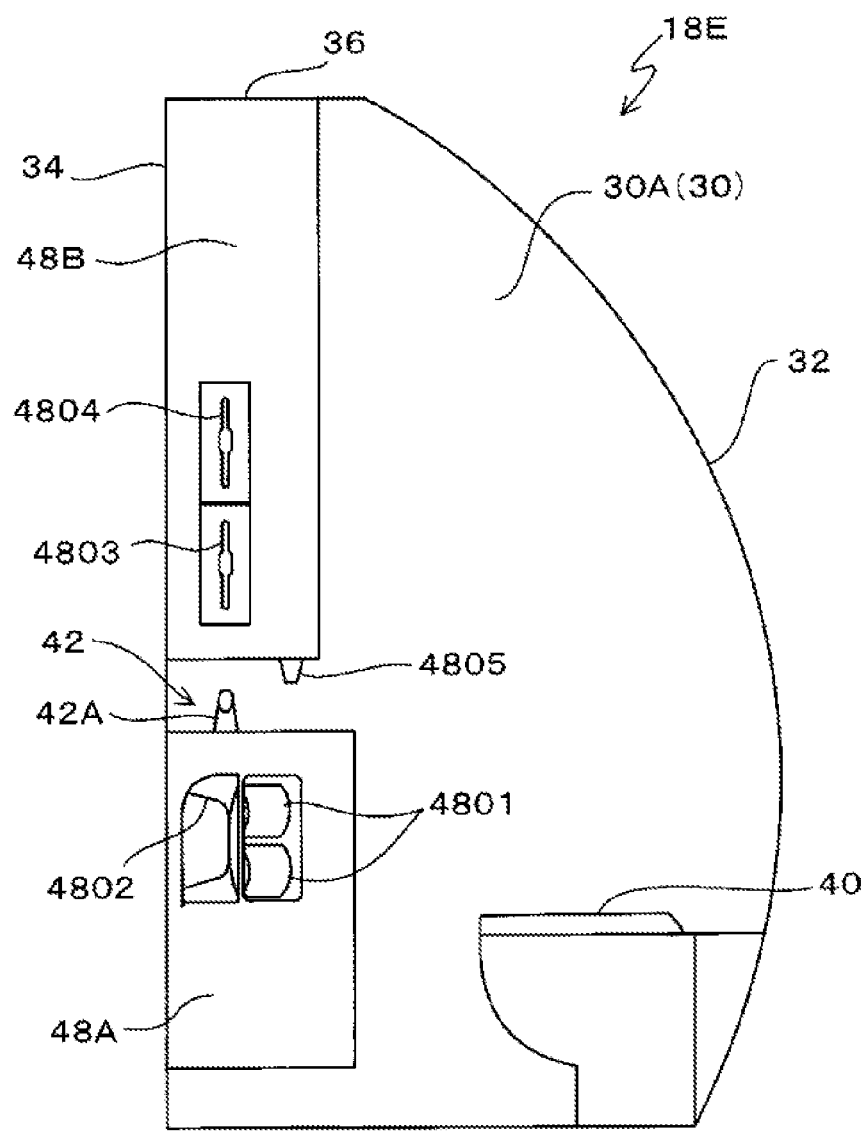
FIG. 16 is a view taken along the arrow A in FIG. 15.
Figure 17:
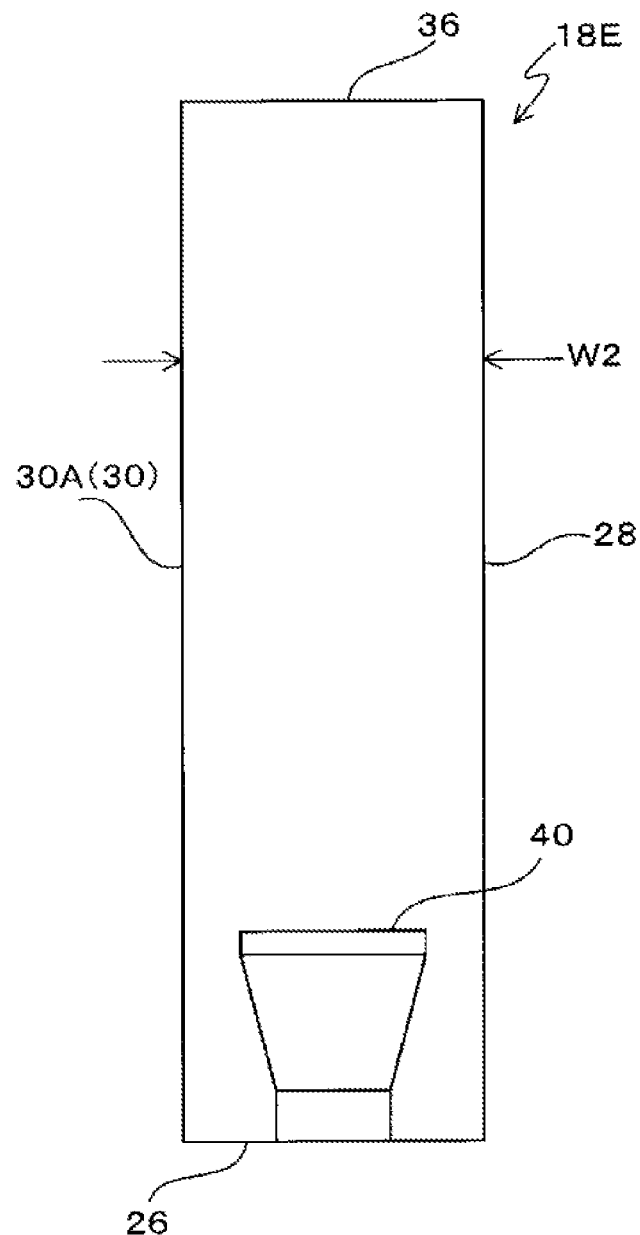
FIG. 17 is a view taken along the arrow B in FIG. 15.

Dispensers for paper towels, tissue paper, and paper cups are housed in the upper housing compartment 48B; in FIG. 16, 4803 is a paper towel dispenser mouth, 4804 is a tissue paper dispenser mouth, and 4805 is a paper cup.

In addition to naturally yielding the effects of the first embodiment, the fifth embodiment has a shorter length L of the wide-space-section side wall 30B, which is advantageous in easily entering and exiting the rear seat rows 22A from and to the longitudinal aisle 14.

In the present embodiments, cases in which an aircraft lavatory unit 18A, 18B, 18C, 18D or 18E is installed behind the rear seat row 22A of each of the seat groups 12 on both the left and right sides of the longitudinal aisle 14 have been described, but the present technology also allows for cases in which an aircraft lavatory unit 18A, 18B, 18C, 18D or 18E is installed behind the rear seat row 22A of only one of the seat groups 12, in which case the number of seats 20 can be increased by two.

The present technology may of course also be applied to arrangements comprising two longitudinal aisles 14, in which case there will be three seat groups 12, and an aircraft lavatory unit 18A, 18B, 18C, 18D or 18E may be provided between the latitudinal aisle 16 and the rear seat rows 22A of at least one of the seat groups 12.

What is claimed is:

1. An A structure for arranging the aircraft lavatory unit, the structure comprising:
a fuselage of an aircraft including:
a longitudinal aisle extending in a longitudinal direction of the fuselage;
seat groups having a plurality of seat rows arranged in rows in the longitudinal direction of the fuselage on both left and right sides of the longitudinal aisle, the seat rows having a plurality of seats facing a front of the fuselage and arranged in rows in a latitudinal direction of the fuselage;
a latitudinal aisle extending in the latitudinal direction from a boarding entrance behind the seat groups; and
a rear seat row, constituted by a rearmost seat row of at least one of the seat groups on the left and right sides of the longitudinal aisle, having a seat, located near the longitudinal aisle, removed in comparison to seat rows located in front of the rear seat row,
the aircraft lavatory unit comprising
a body frame including:
a bottom wall;
a first side wall and a second side wall extending from the bottom wall and facing each other;
a rear wall connecting the side walls at one end; and
a front wall connecting the side walls at another end and having a doorway;
the second side wall including a long-space-section side wall located near the rear wall, the long-space-section side wall extending from the bottom wall to at least a height greater than a height of a backrest of an aircraft the seat when in an upright position, the second side wall forming, between the long-space-section side wall and the first side wall, a long space section extending linearly with a uniform width and a wide-space-section side wall located near the front wall, the wide-space-section side wall extending from the bottom wall, connecting to the long-space-section side wall and forming, between the wide-space-section side wall and the first side wall, a wide space section having a greater width than the long space section;

the body frame having a toilet bowl and a wash basin arranged therein to form a lavatory;

the toilet bowl being arranged at an end in an extending direction of the long space section near the rear wall;

the wash basin being arranged at one end in a width direction of the wide space section; and a width of the body frame where the long-space-section side wall exposed to an outer side of the body frame is located being set to minimum dimensions sufficient for ensuring that the long space section has a width allowing a person to come and go between the doorway and the toilet bowl and allowing a person to sit on the toilet bowl, the aircraft lavatory unit being arranged so that the long-space-section side wall is located adjacent to a backrest of the seat in the rear seat row, the wide-space-section side wall is located in the location of the removed seat, the first side wall faces the latitudinal aisle, and the front wall faces the longitudinal aisle.

2. The structure for arranging the aircraft lavatory unit according to claim 1, wherein the doorway is arranged so as to be closer to another end in the width direction of the wide space section.

3. The structure for arranging the aircraft lavatory unit according to claim 2, wherein the body frame further has a ceiling wall forming a ceiling of the lavatory; and the long-space-section side wall extends from the bottom wall to the ceiling wall.

4. The structure for arranging the aircraft lavatory unit according to claim 3, wherein a luggage compartment is provided on an outer surface located on an opposite side from the long space section of the long-space-section side wall at a location higher than the height of the backrest of the aircraft seat when in an upright position.

5. The structure for arranging the aircraft lavatory unit according to claim 2, wherein the body frame further has a ceiling wall forming a ceiling of the lavatory; the long-space-section side wall extends to a height greater than the height of the backrest of the aircraft seat when in an upright position;

a projecting wall section projecting from an upper end of the long-space-section side wall in a direction away from the first side wall and connecting to the ceiling wall and the rear wall is provided; and a storage shelf for the lavatory is formed at a location inside the projecting wall section.

6. The structure for arranging the aircraft lavatory unit according to claim 5, wherein the wide-space-section side wall has an extending surface section extending from an end of the long-space-section side wall near the wide-space-section side wall in a direction away from the first side wall, and a side wall section bending away from the extending surface section, extending in parallel with the first side wall, and connecting to the front wall; and the projecting wall section has an undersurface section extending from the upper end of the long-space-section side wall in a direction away from the first side wall, and a side wall section bending away from the undersurface section, extending in parallel with the first side wall, and continuously connecting with the ceiling wall and the side wall section of the wide-space-section side wall.

7. The structure for arranging the aircraft lavatory unit according to claim 6, wherein the width of the body frame where the wide space section is located is set to minimum dimensions sufficient for ensuring that the wide space section has a width allowing a person to pass through between the wash basin and the first side wall and allowing a person to come and go between the doorway and the long space section.

8. The structure for arranging the aircraft lavatory unit according to claim 7, wherein the width of the body frame where the long-space-section side wall exposed to the outer side of the body frame is located is from 600 mm to 750 mm.

9. The structure for arranging the aircraft lavatory unit according to claim 1, wherein the body frame further has a ceiling wall forming a ceiling of the lavatory; and the long-space-section side wall extends from the bottom wall to the ceiling wall.

10. The structure for arranging the aircraft lavatory unit according to claim 9, wherein a luggage compartment is provided on an outer surface located on an opposite side from the long space section of the long-space-section side wall at a location higher than the height of the backrest of the aircraft seat when in an upright position.

11. The structure for arranging the aircraft lavatory unit according to claim 1, wherein the body frame further has a ceiling wall forming a ceiling of the lavatory;

the long-space-section side wall extends to a height greater than the height of the backrest of the aircraft seat when in an upright position;

a projecting wall section projecting from an upper end of the long-space-section side wall in a direction away from the first side wall and connecting to the ceiling wall and the rear wall is provided; and a storage shelf for the lavatory is formed at a location inside the projecting wall section.

12. The structure for arranging the aircraft lavatory unit according to claim 11, wherein the wide-space-section side wall has an extending surface section extending from an end of the long-space-section side wall near the wide-space-section side wall in a direction away from the first side wall, and a side wall section bending away from the extending surface section, extending in parallel with the first side wall, and connecting to the front wall; and the projecting wall section has an undersurface section extending from the upper end of the long-space-section side wall in a direction away from the first side wall, and a side wall section bending away from the undersurface section, extending in parallel with the first side wall, and continuously connecting with the ceiling wall and the side wall section of the wide-space-section side wall.

13. The structure for arranging the aircraft lavatory unit according to claim 1, wherein the width of the body frame where the wide space section is located is set to minimum dimensions sufficient for ensuring that the wide space section has a width allowing a person to pass through between the wash basin and the first side wall and allowing a person to come and go between the doorway and the long space section.

14. The structure for arranging the aircraft lavatory unit according to claim 1, wherein the width of the body frame where the long-space-section side wall exposed to the outer side of the body frame is located is from 600 mm to 750 mm.

* * * * *